(12) United States Patent
David et al.

(10) Patent No.: US 9,178,771 B2
(45) Date of Patent: Nov. 3, 2015

(54) DETERMINING THE TYPE OF A NETWORK TIER

(75) Inventors: Efrat Ben David, Alfe Menashe (IL); Eyal Kenigsberg, Dolev (IL); Michael Gopshtein, Yahud (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 522 days.

(21) Appl. No.: 13/592,858

(22) Filed: Aug. 23, 2012

(65) Prior Publication Data
US 2014/0059202 A1 Feb. 27, 2014

(51) Int. Cl.
G06F 15/173 (2006.01)
G06F 15/16 (2006.01)
H04L 12/24 (2006.01)
H04L 12/26 (2006.01)

(52) U.S. Cl.
CPC ............... *H04L 41/14* (2013.01); *H04L 43/18* (2013.01); *H04L 43/50* (2013.01)

(58) Field of Classification Search
CPC .......... H04L 41/14; H04L 43/18; H04L 43/50
USPC .......................................... 709/223, 224, 246
See application file for complete search history.

(56) References Cited

U.S. PATENT DOCUMENTS

| 6,891,839 | B2* | 5/2005 | Albert et al. ................... 370/401 |
| 6,954,786 | B1* | 10/2005 | Vered et al. .................... 709/223 |
| 7,174,422 | B1* | 2/2007 | Kowalchik et al. ........... 711/114 |
| 7,269,664 | B2* | 9/2007 | Hutsch et al. ................. 709/246 |
| 7,353,272 | B2* | 4/2008 | Robertson et al. ............ 709/224 |
| 7,418,486 | B2* | 8/2008 | Brubacher et al. ............ 709/220 |
| 7,512,706 | B2* | 3/2009 | Anand ........................... 709/240 |
| 7,555,497 | B2* | 6/2009 | Thompson et al. .................... 1/1 |
| 7,689,921 | B2* | 3/2010 | Rajarajan et al. ............. 715/744 |
| 7,697,527 | B2* | 4/2010 | Figueira et al. ............... 370/392 |
| 7,734,738 | B2* | 6/2010 | Daniel et al. .................. 709/220 |
| 7,823,062 | B2* | 10/2010 | Liberty et al. ................. 715/234 |
| 8,095,649 | B2* | 1/2012 | Malloy et al. ................. 709/224 |
| 8,228,916 | B2* | 7/2012 | Figueira et al. ............... 370/392 |
| 8,479,259 | B2* | 7/2013 | Devine et al. ..................... 726/3 |

(Continued)

FOREIGN PATENT DOCUMENTS

WO WO-2011099874 8/2011

OTHER PUBLICATIONS

Hewlett-Packard Development Company, L.P., "HP End User Management software," Data Sheet, Jun. 2008, retrieved from: <http://www.j9tech.com/wp-content/uploads/2009/07/HP-real-use-monitoring.pdf>.

(Continued)

*Primary Examiner* — Viet Vu
*Assistant Examiner* — Michael A Chambers
(74) *Attorney, Agent, or Firm* — Hewlett-Packard Patent Department

(57) ABSTRACT

Examples disclosed herein relate to determining the type of a network tier. Examples include determining that a target network tier is a forwarding type network tier if a protocol of communications between the target network tier and a source network resource is the same as a protocol of communications between the target network tier and a backend network tier. Examples further include comparing select content of communications between the target and backend network tiers to select content of communications between the target network tier and the source networking resource, if the protocols are the same.

15 Claims, 5 Drawing Sheets

(56) References Cited

U.S. PATENT DOCUMENTS

| | | | |
|---|---|---|---|
| 8,745,215 B2* | 6/2014 | Niemczyk et al. | 709/224 |
| 8,872,880 B1* | 10/2014 | Matselyukh et al. | 348/14.08 |
| 2002/0141401 A1* | 10/2002 | Albert et al. | 370/389 |
| 2003/0014530 A1* | 1/2003 | Bodin et al. | 709/231 |
| 2003/0018694 A1* | 1/2003 | Chen et al. | 709/200 |
| 2003/0083882 A1* | 5/2003 | Schemers, III et al. | 704/270.1 |
| 2003/0154266 A1* | 8/2003 | Bobick et al. | 709/223 |
| 2003/0172145 A1* | 9/2003 | Nguyen | 709/223 |
| 2004/0111501 A1* | 6/2004 | Lee et al. | 709/222 |
| 2004/0215630 A1* | 10/2004 | Parekh et al. | 707/100 |
| 2005/0027858 A1* | 2/2005 | Sloth et al. | 709/224 |
| 2005/0027881 A1* | 2/2005 | Figueira et al. | 709/238 |
| 2006/0085420 A1* | 4/2006 | Hwang | 707/10 |
| 2007/0124465 A1* | 5/2007 | Malloy et al. | 709/224 |
| 2008/0027962 A1* | 1/2008 | Rong et al. | 707/101 |
| 2008/0082978 A1* | 4/2008 | Or et al. | 718/100 |
| 2008/0133594 A1* | 6/2008 | Fotinatos et al. | 707/104.1 |
| 2008/0281961 A1* | 11/2008 | Niemczyk et al. | 709/224 |
| 2009/0327511 A1* | 12/2009 | Kim et al. | 709/232 |
| 2010/0005513 A1* | 1/2010 | Bradley et al. | 726/4 |
| 2010/0008233 A1* | 1/2010 | Ee et al. | 370/241 |
| 2010/0049847 A1* | 2/2010 | Muret et al. | 709/224 |
| 2010/0215045 A1* | 8/2010 | Figueira et al. | 370/392 |
| 2010/0229096 A1* | 9/2010 | Maiocco et al. | 715/734 |
| 2011/0047413 A1* | 2/2011 | McGill et al. | 714/15 |
| 2011/0119267 A1* | 5/2011 | Forman et al. | 707/737 |
| 2011/0252124 A1* | 10/2011 | Bonner et al. | 709/224 |
| 2012/0011329 A1* | 1/2012 | Nonaka | 711/154 |
| 2012/0054867 A1* | 3/2012 | Aly et al. | 726/23 |
| 2012/0137100 A9* | 5/2012 | Kavuri | 711/170 |
| 2012/0239725 A1* | 9/2012 | Hartrick et al. | 709/203 |
| 2013/0060932 A1* | 3/2013 | Ofek et al. | 709/224 |
| 2013/0067073 A1* | 3/2013 | Niemczyk et al. | 709/224 |
| 2014/0153437 A1* | 6/2014 | Tracy et al. | 370/254 |
| 2014/0165128 A1* | 6/2014 | Auvenshine et al. | 726/1 |

OTHER PUBLICATIONS

Hewlett-Packard Development Company, L.P., "HP End User Management software," Data Sheet, Oct. 2007, retrieved from: <http://www.structuredweb.com/sw/swchannel/CustomerCenter/documents/6888/16463/EndUserMgmt.pdf>.

Hewlett-Packard Development Company, L.P., "HP Real User Monitor software," retrieved Aug. 13, 2012, retrieved from: <http://www8.hp.com/us/en/software-solutions/software.html?compURI=1172877#.UB6Lf03iZhg>.

IBM, "Administering Custom Advisors for the Proxy Server," WebSphere Application Server Version 8.5 Information Center, Jun. 13, 2012, retrieved from: <http://pic.dhe.ibm.com/infocenter/wasinfo/v8r5/index.jsp?topic=%2Fcom.ibm.websphere.nd.doc%2Fae%2Ftjpx_custadv.html>.

John Sullivan, "Monitoring more than real user sessions with HP Real User Monitor," Hewlett-Packard Development Company, L.P., Aug 10, 2012; retrieved from: <http://www.slideshare.net/hpsoftwaresolutions/hp-software-universe-monitoring-more-than-real-user-sessions-with-hp-real-user-monitor>.

Sonja Hickey, "HP Real User Monitor: The solution to non-intrusive, out-of-the-box monitoring of MQ communications!," Feb. 15, 2012, retrieved from: <http://h30499.www3.hp.com/t5/Business-Service-Management-BAC/HP-Real-User-Monitor-The-solution-to-non-intrusive-out of-the/ba-p/5552703#.UB6L0031Zhg>.

* cited by examiner

DETERMINING THE TYPE OF A NETWORK TIER

BACKGROUND

A computing service management system may manage a computing network, including both physical and virtual infrastructure, as well as applications implemented on the computer network. Such a management system may include traffic monitoring system to monitor the traffic in the network, and the management system may analyze the performance of the network, including applications implemented on the network, based on the monitored traffic. For example, an enterprise may operate a computer network including a web server system, and the traffic monitoring system may monitor the traffic in the web server system and analyze the performance of the web server system based on the monitored traffic. In some examples, the computer network may include multiple tiers, and the traffic monitoring system may monitor the traffic between the network tiers.

BRIEF DESCRIPTION OF THE DRAWINGS

The following detailed description references the drawings, wherein.

DETAILED DESCRIPTION

Figure 1:
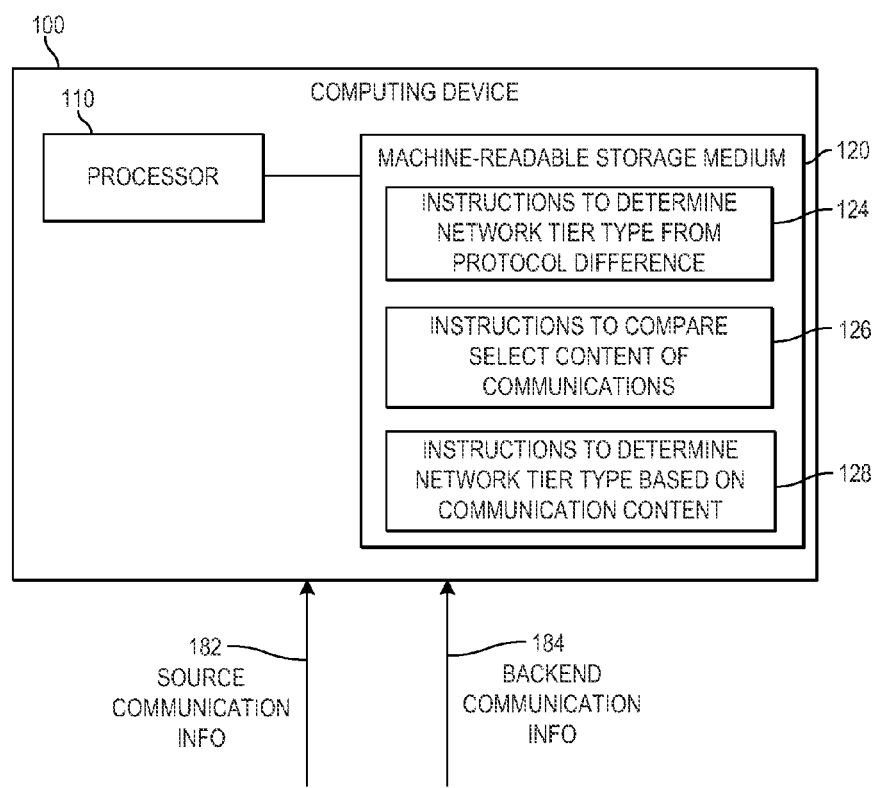
FIG. 1 is a block diagram of an example computing device to determine the type of a network tier based on communication content.

As noted above, a traffic monitoring system of a computing service management system may monitor the traffic between multiple tiers of a computer network. Based on the monitored traffic, the management system may analyze the performance of the different tiers, such as the time consumed by each tier to process a given user transaction. In such examples, analysis of the communication between network tiers may enable the management system to better model the monitored application. As one example, an enterprise may operate a computer network including a web server system implementing a web service such as an online store, an online application (e.g., a banking application, etc.), and the like, or a combination thereof. Such a web server system may include a plurality of computing devices, such as load balancers, web servers, database servers, a gateway server, and the like, divided into multiple logical tiers. An example of such a tiered server system may include, for example, a front-end tier which may receive requests from a client system, and a plurality of back-end tiers to perform various functions in response to the requests received by the front-end tier.

In such examples, each network tier of the tiered server system may be a processing type network tier or a forwarding type network tier. As used herein, a "processing type network tier" may be a network tier of a tiered server system that, in response to a received request, may provide a substantively different request to another network tier of the tiered server system. For example, a processing type network tier may include a web server that, in response to a received Hypertext Transfer Protocol (HTTP) request, may provide a database query to a database server of another tier to collect data for responding to the received HTTP request. Similarly, a processing type network tier may, in response to receiving a response communication, output a response substantively different from the received response. In some examples, the substantively different response may be provided to the component (e.g., computing device or network tier) from which the initial request was received.

As used herein, a "forwarding type network tier" may be a network tier of a tiered server system that, in response to a received request, may provide to another network tier of the tiered server system another request that is substantively duplicative of the received request. In some examples, the substantively duplicative request may include some non-substantive differences relative to the received request, such as differences in the message headers (e.g., the destination addresses, etc.) of the two requests. A forwarding type network tier may also, in response to receiving a response from the other network tier, output a response that is substantively duplicative of the received response. In some examples, the duplicative response may be provided to the component (e.g., computing device or network tier) from which the initial request was received. A forwarding type network tier may include, for example, a load balancer, a proxy server, or any other server or computer networking device or equipment to, in effect, forward received communications to other network tiers by outputting communications substantively duplicative of respective received communications.

Users of a computing service management system may benefit from network traffic analysis that distinguishes between the impact on performance of processing type network tiers and forwarding type network tiers. For example, if a forwarding type network tier is deployed in a computer network, management personnel may benefit from analysis of the effect of the forwarding type network tier on user experience when interacting with the computer network. However, even in management systems capable of automated discovery of the different network tiers of a computer network, configuration information identifying each tier as a forwarding or processing type network tier is entered manually. Such manual configuration of the computing service management system to indicate which network tiers are processing type network tiers and which are forwarding type network tiers may be time-consuming, complicated, and error-prone, especially in large scale computer networks.

To address these issues, examples described herein may determine whether a network tier is a processing type network tier or a forwarding type network tier based on monitored communications among the network tiers. For example, examples described herein may determine that a target network tier of a tiered server system is a processing type network tier, if a communication protocol utilized between the target network tier and a backend network tier of the tiered server system is different than a communication protocol utilized between the target network tier and a source network resource. If the protocols are the same, examples described herein may determine the target network tier to be a forwarding type network tier if content of respective communications between the target and backend network tiers matches content of respective communications between the target network tier and the source network resource, for at least a threshold amount of communications. Additionally, in some examples, the target network tier may be determined to be a processing type network tier if the content does not match for at least the threshold amount of communications.

In some examples described herein, the determination of the network tier type for the target network tier may be reported to management personnel by the computing service management system or added to configuration information for the target network tier in the computing service management system. In this manner, examples described herein may simplify or even automate the process of configuring the type of network tiers in the computing service management system, which may reduce at least one of the time, complexity, and likelihood of errors associated with manual configuration of network tier type.

Referring now to the drawings, FIG. 1 is a block diagram of an example computing device 100 to determine the type of network tier based on communication content. As used herein, a "computing device" may be a desktop computer, notebook computer, workstation, server, computer networking device, a chip set, or any other processing device or equipment. In the example of FIG. 1, computing device 100 includes a processor 110 and a machine-readable storage medium 120 encoded with instructions 124, 126, and 128. In some examples, storage medium 120 may include additional instructions. In other examples, instructions 124, 126, 128, and any other instructions described herein in relation to storage medium 120 may be stored remotely from computing device 100.

As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processor 110 may fetch, decode, and execute instructions stored on storage medium 120 to implement the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. Further, any machine-readable storage medium described herein may be non-transitory.

In the example of FIG. 1, computing device 100 may implement at least a portion of a traffic monitoring system to monitor traffic between components of a tiered server system. As used herein, a "tiered server system" is a network of interconnected computing devices including at least one server, wherein at least a portion of the network forms at least one set of network tiers to receive and process requests received from outside of the network. As used herein, a "network tier" is a logical subdivision of at least some of the computing devices of a network of interconnected computing devices, the logical subdivision including at least one computing device of the network. In some examples, the network of computing devices may be or include a portion of any suitable type of computer network, such as, for example, a local area network (LAN), a wireless local area network (WLAN), a virtual private network (VPN), and the like, or a combination thereof. In some examples, the tiered server system may be a computer network operated by an enterprise to implement a web service (e.g., online store, online application, etc.), or the like.

In examples described herein, communications provided to, provided by, or received from a network tier may be communications provided to, provided by, or received from any computing device included in the logical subdivision forming that network tier. In some examples, the tiered server system may include a front-end network tier and at least one other network tier. In such examples, the front-end network tier may receive requests from outside of the tiered server system and process and respond to those requests alone or in cooperation with at least one other network tier. In some examples, a set of network tiers of a network may be defined for a particular class of requests provided to the network (which may also be referred to as an "application"). In such examples, a particular class of requests may be defined by certain characteristics or attributes of the requests, such as a destination address (e.g., uniform resource locator (URL), Internet Protocol (IP) address, etc.), destination port, or the like. In such examples, multiple different sets of network tiers may be defined in a network for different classes of requests (or applications). Additionally, a set of network tiers may be defined for a subset of the network that includes less than all of the computing devices of the network.

As noted above, computing device 100 may implement a portion of a traffic monitoring system to monitor traffic between components of the tiered server system. In some examples, computing device 100 may additionally determine a network tier type of a target network tier of the tiered server system based on monitored communications between a source network resource and the target network tier, and monitored communications between the target network tier and a backend network tier. In such examples, the target network tier may be any network tier of the tiered server system configured to provide requests to another network tier of the tiered server system. As used herein, a "network resource" is at least one computing device capable of communicating with a network tier of a tiered server system via a computer network. For example, a network resource may be any computing device capable of providing a request to a front-end network tier of a tiered server system. In other examples, a network resource may be a network tier of a tiered server system.

In some examples, a forwarding type network tier is a network tier configured to output, in response to receiving requests of one protocol, substantively duplicative requests of the same protocol to another network tier, while a processing type network tier may output requests of a protocol different than that of requests received by the network tier. As such, in some examples, instructions 124 may compare the respective protocols of communications exchanged with the target network tier. In the example of FIG. 1, instructions 124 may determine that the target network tier is a processing type network tier, if a backend communication protocol utilized between the target network tier and a backend network tier is different than a source communication protocol utilized between the target network tier and a source network resource.

As illustrated in FIG. 1, computing device 100 may receive source communication information 182 and backend communication information 184, and may determine whether the source and backend communication protocols are different based on received information 182 and 184. Computing device 100 may receive information 182 and 184 via a network interface of computing device 100, for example. As used herein, a "network interface" is at least one hardware component that may be used by a computing device to communicate with at least one other computing device via a communications network including at least one computer network, at least one telephone network, or a combination thereof.

In some examples, computing device 100 may, as part of the traffic monitoring system, monitor network traffic between the source network resource and the target network tier, and between the target and backend network tiers. In such examples, source communication information 182 received by computing device 100 may include or represent traffic exchanged between the source network resource and the target network tier. Additionally, backend communication information 184 received by computing device 100 may include or represent traffic exchanged between the target and backend network tiers. In such examples, storage medium 120 may include instructions to identify the source protocol based on information 182, and to identify the backend protocol based on information 184. In such examples, after the source and backend protocols are identified, instructions 124 may determine that the target network tier is a processing type network tier if the identified protocols are the same.

In other examples, computing device 100 may, as part of the traffic monitoring system, receive information 182 and 184 from at least one other component of the traffic monitoring system, such as at least one traffic monitoring probe. In such examples, at least one traffic monitoring probe may monitor traffic input to and output from a network tier and identify the protocol of the traffic. For example, a traffic monitoring probe may monitor traffic exchanged between the source network resource and the target network tier. Based on this traffic, the probe may identify the source protocol and provide, to computing device 100, source communication information 182 indicating the identity of the source protocol. The same or another traffic monitoring probe may monitor traffic between the target and backend network tiers, identify the backend protocol from the monitored traffic, and provide backend communication information 184 indicating the identity of the backend protocol to computing device 100. In such examples, instructions 124 may determine from information 182 and 184 whether the source and backend protocols are different.

If the source and backend communication protocols are the same, then the target network tier may be a forwarding type network tier outputting substantively duplicative communications, or a processing type network tier outputting communications that are substantively different than received communications but utilizing the same protocol. For example, a processing type network tier may include a web server that, in response to an HTTP request, may provide a substantively different HTTP request to another web server of a another network tier. Such a processing type network tier may also, in response to receiving an HTTP response from the other network tier, output a substantively different HTTP response (e.g., in response to the initial HTTP request). Accordingly, in some examples, if the source and backend protocols are the same, instructions 126 may compare content of communications exchanged with target network tier to determine whether, for example, the target network tier outputs communications that are substantively duplicative of the communications it receives.

In the example of FIG. 1, if the source and backend communication protocols are the same, instructions 126 may compare select content of respective backend communications between the target and backend network tiers to select content of respective source communications between the target network tier and the source network resource. In some examples, communications whose content is compared by instructions 126 may include requests, responses, or both. As used herein, the "content" of a communication is a portion of the communication excluding a message header portion of the communication. In some examples, the message header portion of a communication may include at least a destination address for the communication.

Also, as used herein, "select content" of a communication, such as a request or response, is a defined portion of the content of the communication. For example, the select content of a communication may be all of the content of the communication (e.g., the communication excluding the message header) or some defined, lesser portion of the content of the communication. In some examples, computing device 100 may include a configurable parameter defining the amount of the select content of communications to be compared by instructions 126. The amount of the select content may be defined in any suitable manner. For example, the parameter may specify a certain number of bytes of communication content. In such examples, instructions 126 may compare the specified number of bytes of the content of a first communication to the specified number of bytes of the content of a second communication, for each pair of communications compared by instructions 126. In some examples, the configurable parameter defining the amount of the select content may be set in any suitable manner. For example, the parameter may be set via a user interface of the traffic monitoring system, or another user interface of the computing service management system. In some examples, comparing select content of communications may consume less processing capacity than comparing the full message content for each communication.

In some examples, instructions 126 may determine, for each of the backend communications, that the select content of one of the backend communications matches select content of one of the source communications if backend test data derived from the select content of the backend communication is equivalent to source test data derived from the select content of the respective source communication. In such examples, the test data may be a checksum, hash value, or the like, derived from the select content of a communication using, for example, a checksum function, a hash function, or the like. For example, for each backend communication, the backend test data may be a hash value derived from the select content of the backend communication and, for each source communication, the source test data may be a hash value derived from the select content of the source communication. In some examples, the test data derived from the select content will be smaller (e.g., fewer bytes) than the select content itself, so comparing test data for the communications may consume less processing capacity than if the select content itself were compared for pairs of communications.

In examples in which computing device 100 receives source and backend communications (e.g., as source communication information 182 and backend communication information 184, respectively), instructions 126 may, for each received communication, derive the test data from the select content of the communication. For example, for each communication, instructions 126 may derive a hash value for the select content of the communication using a hash function (e.g., MD5, etc.). In other examples, at least one traffic monitoring probe may monitor communications in and out of the target network tier, derive source and backend test data (e.g., checksums, hash values, etc.) from select content of each source and backend communication, and provide the test data for each communication to computing device 100. In such examples, computing device 100 may receive the source and backend test data as source and backend communication information 182 and 184, respectively, and instructions 126 may compare the received source and backend test data.

In some examples, the backend communications whose select content is compared by instructions 126 may include backend responses provided from the backend network tier to the target network tier and exclude backend requests provided from the target network tier to the backend network tier. In such examples, the source communications whose select content is compared by instructions 126 may include source responses provided from the target network tier to the source network resource and exclude source requests provided from the source network resource to the target network tier. In such examples, instructions 126 may compare select content of backend responses to select content of source responses. In some examples, source and backend responses may include more content than source and backend requests, and that content may be more distinctive than the request content.

In some examples, a forwarding type network tier may receive requests and, in response, output substantively duplicative requests to another network tier. Such a forwarding type network tier may also receive responses from the other network tier and, in response, output substantively duplicative responses to a network resource from which it received the initial requests. In contrast, a processing type network tier may output substantively different requests in response to received requests, and output substantively different responses in response to received responses.

As such, in some examples, instructions 128 may determine that the target network tier is a forwarding type network tier if, for at least a threshold amount of the backend communications, the select content of a respective backend communication matches the select content of a respective source communication. In some examples, the threshold amount of the backend communications is a threshold percentage of the backend communications exchanged between the target and backend network tiers within a threshold time period.

In other examples, the threshold amount of backend communications may be quantified in any other suitable manner. In some examples, the threshold time period may be any suitable amount of time, such as a number of minutes (e.g., five minutes) or seconds. Computing device 100 may include a configurable parameter defining the threshold time period. In some examples, the configurable parameter defining the threshold time period may be set in any suitable manner. For example, the parameter may be set via a user interface of the traffic monitoring system, or another user interface of the computing service management system.

In some examples, instructions 128 may also determine that the target network tier is a processing type network tier if the amount of the backend communications having select content matching the select content of a respective source communication is less than the threshold amount. For example, instructions 128 may determine that the target network tier is a processing type network tier if the amount of the backend communications having select content matching the select content of a respective source communication is less than a threshold percentage of the backend communications exchanged between the target and backend network tiers within the threshold time period.

Also, as noted above, in some examples, the backend communications whose select content is compared by instructions 126 may include backend responses and exclude backend requests, and the source communications whose select content is compared by instructions 126 may include source responses and exclude source requests. Accordingly, in some examples, instructions 128 may determine whether the target network tier is a forwarding or processing type network tier based on whether the amount of the backend responses having select content matching the select content of a respective source response is less than a threshold percentage of the backend responses provided from the backend network tier to the target network tier within the threshold time period. In this manner, some examples described herein may determine whether sufficient responses output by the target network tier are substantively duplicative of responses received by the target network tier to identify the target network tier as a forwarding type network tier.

As noted above, the target network tier may be any network tier of the tiered server system that may provide requests to another network tier of the tiered server system. For example, the target network tier may be a front-end network tier of the tiered server system including a gateway server that may receive requests from a source network resource outside of the tiered server system and, in response, provide respective requests to another network tier of the tiered server system. In other examples, the target network tier may be a network tier of the tiered server system other than a front-end network tier. In such examples, the source network resource, the target network tier, and the backend network tier may each be network tiers of the tiered server system. In some examples, functionalities described herein in relation to FIG. 1 may be provided in combination with functionalities described herein in relation to any of FIGS. 2A-4.

Figure 2A:
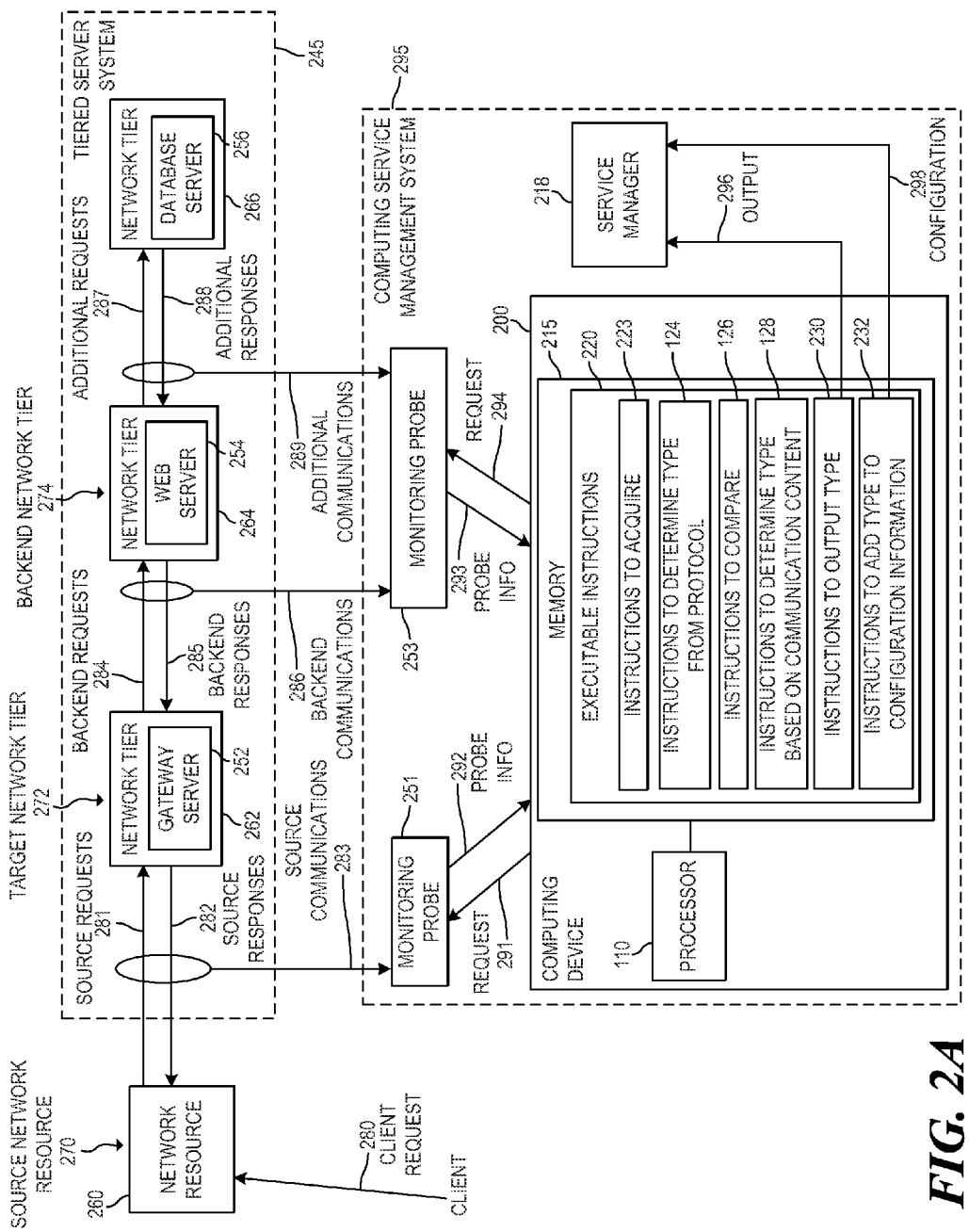
FIG. 2A is a block diagram of an example system to determine the type of a network tier based on monitoring probe information.

FIG. 2A is a block diagram of an example computing service management system 295 including a computing device 200 to determine the type of a network tier based on monitoring probe information. In the example of FIG. 2A, computing device 200 may include a processor 110, as described above in relation to FIG. 1. Computing device 200 may also include a memory 215, which may be a machine-readable storage medium. Memory 215 may be encoded with a set of executable instructions 220, including at least instructions 124, 126, and 128, as described above in relation to FIG. 1, and instructions 223, 230, and 232. In other examples, executable instructions 220 may include additional instructions. In the example of FIG. 2A, processor 110 may fetch, decode, and execute instructions stored on memory 215 to implement the functionalities described below. In other examples, the functionalities of any of the instructions stored on memory 215 may be implemented in the form of electronic circuitry, in the form of executable instructions encoded on a machine-readable storage medium, or a combination thereof.

In the example of FIG. 2A, computing service management system 295 may manage a computer network comprising a tiered server system 245 including network tiers 262, 264, and 266. In some examples, tiered server system 245 may include more or fewer network tiers. Network tier 262 may include at least a gateway server 252. In such examples, network tier 262 may be the front-end network tier of tiered server system 245, and may receive source requests from a client system outside of tiered server system 245. For example, network tier 262 may exchange source communications 283 with a network resource 260 outside of tiered server system 245. Source communications 283 may include source requests 281 provided from network resource 260 to network tier 262 and source responses 282 provided from network tier 262 to network resource 260.

Network resource 260 may be a computing device of a client or user accessing a service (e.g., website, online application, etc.) implemented by system 245. In other examples, network resource 260 may be a computing device of an intermediary, such as an Internet Service Provider (ISP), through which the user or client's computing device may access system 245. In such examples, the client's computing device may provide a client request 280 to at least one network resource 260 (either directly or through other computing devices), and the network resource 260 may in response provide, to network tier 262, a source request 281 that is the same as or substantively duplicative of client request 280.

In some examples, network tier 264 may include at least one web server 254 and exchange backend communications 286 with network tier 262. Backend communications 286 may include backend requests 284 provided from network tier 262 to network tier 264 and backend responses 285 provided from network tier 264 to network tier 262. Network tier 262, including gateway server 252, may be a forwarding type network tier that may receive requests 281 (e.g., HTTP requests) and provide substantively duplicative backend requests 284 (e.g., HTTP requests) to network tier 264 (e.g., to a web server 254 of tier 264) in response.

In some examples, network tier 266 may include at least one database server 256 and exchange additional communications 289 with network tier 264. Additional communications 289 may include additional requests 287 provided from network tier 264 to network tier 266 and additional responses 288 provided from network tier 266 to network tier 264. Network tier 264, including web server 254, may be a processing type network tier that may receive requests 284 (e.g., HTTP requests) and provide substantively different requests 287 (e.g., database queries) to network tier 266 (e.g., to a database server 256). In response, network tier 266 may provide information requested in the database query to network tier 264 in a response 288. In response to receiving the database response 288, a web server 254 of network tier 264 may formulate and provide a response 285 (e.g., an HTTP response) to network tier 262, which may in turn provide a substantively duplicative response 282 to network resource 260.

In other examples, tiered server system may include additional network tiers. For example, system 245 may include a network tier including at least one load balancer between network tiers 262 and 264, additional tiers including web servers, additional tiers including database servers, and the like. In other examples, system 245 may exclude network tier 262. In such examples, network tier 264 including web server 254 may be the front-end network tier.

In the example of FIG. 2A, system 295 may include a plurality of traffic monitoring probes 251 and 253. In such examples, computing device 200 and probes 251 and 253 may implement a traffic monitoring system of computing service management system 295. For example, the traffic monitoring system implemented by computing device 200 and probes 251 and 253 may monitor the network traffic generated by the network tiers of tiered server system 245. In some examples, system 295 may include more or fewer than two traffic monitoring probes. In the example of FIG. 2A, system 295 may also include a service manager 218 to implement functions of system 295 other than the functions of the traffic monitoring system. In some examples, service manager 218 may include a computing device to, for example, store configuration information associated with the network tiers of system 245 and to implement a user interface for the computing service management system.

Traffic monitoring probe 251 may monitor the traffic input to and output from network tier 262, including source communications 283, which include source requests 281 and source responses 282. In some examples, probe 251 may analyze source communications 283 to identify a protocol of communications 283. For example, traffic monitoring probe 251 may utilize heuristics to identify the protocol of source communications 283 based on a plurality of monitored source requests 281, source responses 282, or a combination thereof. Probe 251 may provide probe information communications 292 to computing device 200. In some examples, a probe information communication 292 may include an identification of the protocol of source communications 283, as determined by probe 251. In some examples, traffic monitoring probe 251 may be implemented on a computing device of system 295, and the functionalities of probe 251 may be implemented in the form of electronic circuitry, in the form of executable instructions encoded on a machine-readable storage medium, or a combination thereof.

In some examples, system 295 may perform automated discovery on a tiered server system 245. In such examples, a user of system 295 may identify a front-end tier (e.g., network tier 262) of tiered server system 245, and system 295 may discover the other network tiers. In some examples, the traffic monitoring system of system 295 may perform the automated discovery. For example, a traffic monitoring probe may discover a network tier in response to identifying traffic having a destination address not configured within system 295. In the example of FIG. 2A, probe 253 may discover network tier 264 in response to identifying at least one backend request 284 output by network tier 262. In such examples, probe 253 may monitor backend communications 286 exchanged between network tiers 262 and 264, including backend requests 284 and backend responses 285. In some examples, probe 253 may analyze backend communications 286 to identify a protocol of communications 286, as described above in relation to probe 251. In such examples, in response to discovering network tier 264, probe 253 may inform computing device 200 of the discovery of network tier 264 in a probe information communication 293. In some examples, traffic monitoring probe 253 may be implemented on a computing device of system 295, and the functionalities of probe 253 may be implemented in the form of electronic circuitry, in the form of executable instructions encoded on a machine-readable storage medium, or a combination thereof. In some examples, the functionality described herein in relation to probes 251 and 253 may be implemented by a single traffic monitoring probe (e.g., probe 251), or divided among more than two probes.

In the example of FIG. 2A, computing device 200 may determine the network tier type of network tiers of tiered server system 245. In some examples, in response to the discovery of a network tier, computing device 200 may determine the network tier type of a network tier one hop away from the discovered network tier. For example, in response to discovery of network tier 264, computing device 200 may determine the network tier type of network tier 262 based on communications between network tier 262 and network resource 260 and communications between network tiers 262 and 264. In some examples, network tier 262 may be referred to as a target network tier 272, network resource 260 (from which target network tier 272 receives requests) may be referred to as a source network resource 270, and network tier 264 (to which target network tier 272 provides requests) may be referred to as a backend network tier 274.

In some examples, instructions 124 may determine that target network tier 272 is a processing type network tier, if a backend communication protocol utilized between target network tier 272 and a backend network tier 274 is different than a source communication protocol utilized between target network tier 272 and source network resource 270, as described above in relation to FIG. 1. In the example of FIG. 2A, instructions 124 may make this determination in response to discovery of network tier 264 (i.e., backend network tier 274).

In some examples, instructions 124 may make this determination based on the respective protocols of requests received by and output by target network tier 272.

For example, in the example of FIG. 2A, in response to discovery of backend network tier 274, instructions 124 may determine that target network tier 272 is a processing type network tier, if a protocol of backend requests 284 provided from target network tier 272 to backend network tier 274 is different than a protocol of source requests 281 received by target network tier 272 from source network resource 270. In the example of FIG. 2A, monitoring probe 253 may determine the protocol of backend requests 284, and instructions 223 may acquire an identification of the protocol of backend requests 284 from monitoring probe 253 (e.g., receive the indication in a probe information communication 292). Additionally, monitoring probe 251 may determine the protocol of source requests 281, and instructions 223 may acquire an identification of the protocol of source requests 281 from monitoring probe 251 (e.g., receive the indication in a probe information communication 293). In such examples, instructions 124 may, in response to discovery of backend network tier 274, determine that target network tier 272 is a processing type network tier, if the protocols identified by probes 251 and 253 are different.

If the respective protocols of backend requests 284 and source requests 281 are the same, instructions 126 may compare select content of respective backend communications 286 between target and backend network tiers 272 and 274 to select content of respective source communications 283 between target network tier 272 and source network resource 270, as described above in relation to FIG. 1. In such examples, instructions 128 may determine that target network tier 272 is a forwarding type network tier if, for at least a threshold amount of the backend communications 286, the select content of a respective backend communication 286 matches the select content of a respective source communication 283, as described above in relation to FIG. 1. Instructions 128 may determine that target network tier 272 is a processing type network tier if the amount of the backend communications 286 having select content matching the select content of a respective source communication 283 is less than the threshold amount, as described above in relation to FIG. 1.

In some examples, the source and backend communications compared by instructions 126 may be source and backend responses 282 and 285. For example, in the example of FIG. 2A, if the respective protocols of backend requests 284 and source requests 281 are the same, instructions 126 may compare select content of backend responses 285, provided from backend network tier 274 to target network tier 272, to select content of source responses 282, provided from target network tier 272 to source network resource 270.

In some examples, the select content of each backend response 285 may exclude a message header of the backend response 285 and the select content of each source response 282 may exclude a message header of the source response 285. Also, in some examples, for each comparison, instructions 126 may compare test data derived from the select content of a respective backend response 285 to test data derived from the select content of a respective source response 282. The test data may be a checksum, hash value, or the like, derived from the select content using, for example, a checksum function, a hash function, or the like, as described above in relation to FIG. 1. For example, instructions 126 may, for each of backend responses 285, determine that the select content of the backend response 285 matches the select content of a respective one of source responses 282 if a backend checksum derived from the select content of the backend response 285 is equivalent to a source checksum derived from the select content of a respective source response 282.

In such examples, traffic monitoring probes 251 and 253 may derive the test data from the select content of the source and backend responses 282 and 285, and instructions 223 may acquire the derived test data from probes 251 and 253. In such examples, instructions 126 may compare the test data (e.g., checksums, hash values, etc.) acquired from probes 251 and 253. In some examples, in response to a determination that the protocols are the same, instructions 223 may request (e.g., via a request 294) that probe 253 calculate a backend checksum (or other test data) from the select content of respective backend responses 285 and request (e.g., via a request 291) that probe 251 calculate a source checksum (or other test data) from the select content of respective backend responses 285. In such examples, instructions 223 may acquire, from probe 253, respective backend checksums derived from backend responses 285 and acquire, from probe 251, respective source checksums derived from source responses 282. In the example of FIG. 2A, target network tier 272 including gateway server 252 may, in response to receiving requests 281, output backend requests 284 substantively duplicative of requests 281 and utilizing the same protocol. In such examples, instructions 126 may determine that the source and backend protocols are the same.

If the respective protocols of the backend and source requests 284 and 281 are the same, instructions 128 may determine whether target network tier 272 is a forwarding or processing type network tier based on whether the select content of a respective backend response 285 matches the select content of a respective source response 282 for at least a threshold amount of the backend responses 285. In the example of FIG. 2A, instructions 128 may determine that target network tier 272 is a forwarding type network tier if, for each of at least the threshold amount of backend responses 285, the select content of the backend response 285 matches the select content of a respective source response 282. In the example of FIG. 2A, network tier 262 including gateway server 252 may, in response to receiving backend responses 285, output substantially duplicative responses 282. In such examples, instructions 128 may determine that target network tier 272 is a forwarding type network tier.

Additionally, instructions 128 may determine that target network tier 272 is a processing type network tier if the select content of a respective backend response 285 matches the select content of a respective source response 282 for less than the threshold amount of backend responses 285. In some examples, the threshold amount of backend responses 285 may be a threshold percentage of backend responses 285 provided from backend 274 network tier to target network tier 272 within a threshold time period. In some examples, a timeout period may be specified for source responses. In some examples, instructions 126 may cease comparing the select content of a given source response (or test data derived from the select content) to the select content of backend responses if matching select content of a backend response is not found within the timeout period.

In the example of FIG. 2A, after determining whether target network tier 272 is a forwarding or processing type network tier, instructions 230 may instruct service manager 218 to output, via a user interface of service manager 218, an indication of the determined type. For example, in response to a determination that the target network tier is a forwarding type network tier, instructions 230 may instruct service manager 218 (e.g., via an output communication 296) to output, via a user interface of service manager 218, an indication that target network tier 272 is a forwarding type network tier. In response, service manager 218 may output the indication to a user via a user interface, and the user may then configure the type of target network tier in system 295 based on the output indication. Similarly, in response to a determination that the target network tier is a processing type network tier, instructions 230 may instruct service manager 218 (e.g., via an output communication 296) to output, via a user interface of service manager 218, an indication that target network tier 272 is a processing type network tier. In response, service manager 218 may output the indication to a user via a user interface.

In other examples, after determining whether target network tier 272 is a forwarding or processing type network tier, instructions 232 may add the determined network tier type for target network tier 272 to configuration information stored at service manager 218. For example, in response to determining that target network tier 272 is a forwarding type network tier, instructions 232 may add, to the configuration information of service manager 218, an indication that target network tier 272 is a forwarding type network tier (e.g., via a configuration communication 298). Similarly, in response to determining that target network tier 272 is a processing type network tier, instructions 232 may add, to the configuration information of service manager 218, an indication that target network tier 272 is a processing type network tier (e.g., via a configuration communication 298).

Also, in the example of FIG. 2A, probe 253 may discover an additional network tier 266 in response to identifying at least one additional request 287 output by backend network tier 274 and having a destination address not configured within system 295. In such examples, in response to discovering additional network tier 266, computing device 200 may determine the network tier type of backend network tier 274.

In such examples, computing device 200 may identify the network tier type of backend network tier 274 in a manner analogous to that described above in relation to target network tier 272. For example, in response to the discovery of additional network tier 266 exchanging additional communications 289 (e.g., network traffic) with backend network tier 274, probe 253 may monitor the additional communications 289, determine an additional protocol utilized between network tiers 274 and 266, and provide an identification of the additional protocol to computing device 200. In the example of FIG. 2A, additional communications 289 may include additional requests 287 and additional responses 288. In such examples, instructions 124 may determine that backend network tier 274 is a processing type network tier if the additional communication protocol utilized between backend and additional network tiers 274 and 266 is different than the backend communication protocol utilized between target and backend network tiers 272 and 274.

If the backend and additional communication protocols are the same, instructions 126 may compare select content of additional communications 289 to the select content of respective backend communications 286, as described above in relation to FIGS. 1 and 2A. In such examples, instructions 128 may determine that backend network tier 274 is a forwarding type network tier if, for at least a threshold amount of additional communications 289, the select content of a respective additional communication 289 matches the select content of a respective backend communication 286, as described above in relation to FIGS. 1 and 2A. In the example of FIG. 2A, backend network tier 274 including web server 252 may, in response to receiving backend requests 284 (e.g., HTTP requests), output substantially different requests 287 (e.g., database queries) of a different protocol. In such examples, instructions 124 may determine that backend network tier 274 is a processing type network tier. In some examples, functionalities described herein in relation to FIG. 2A may be provided in combination with functionalities described herein in relation to any of FIGS. 1 and 2B-4.

Figure 2B:
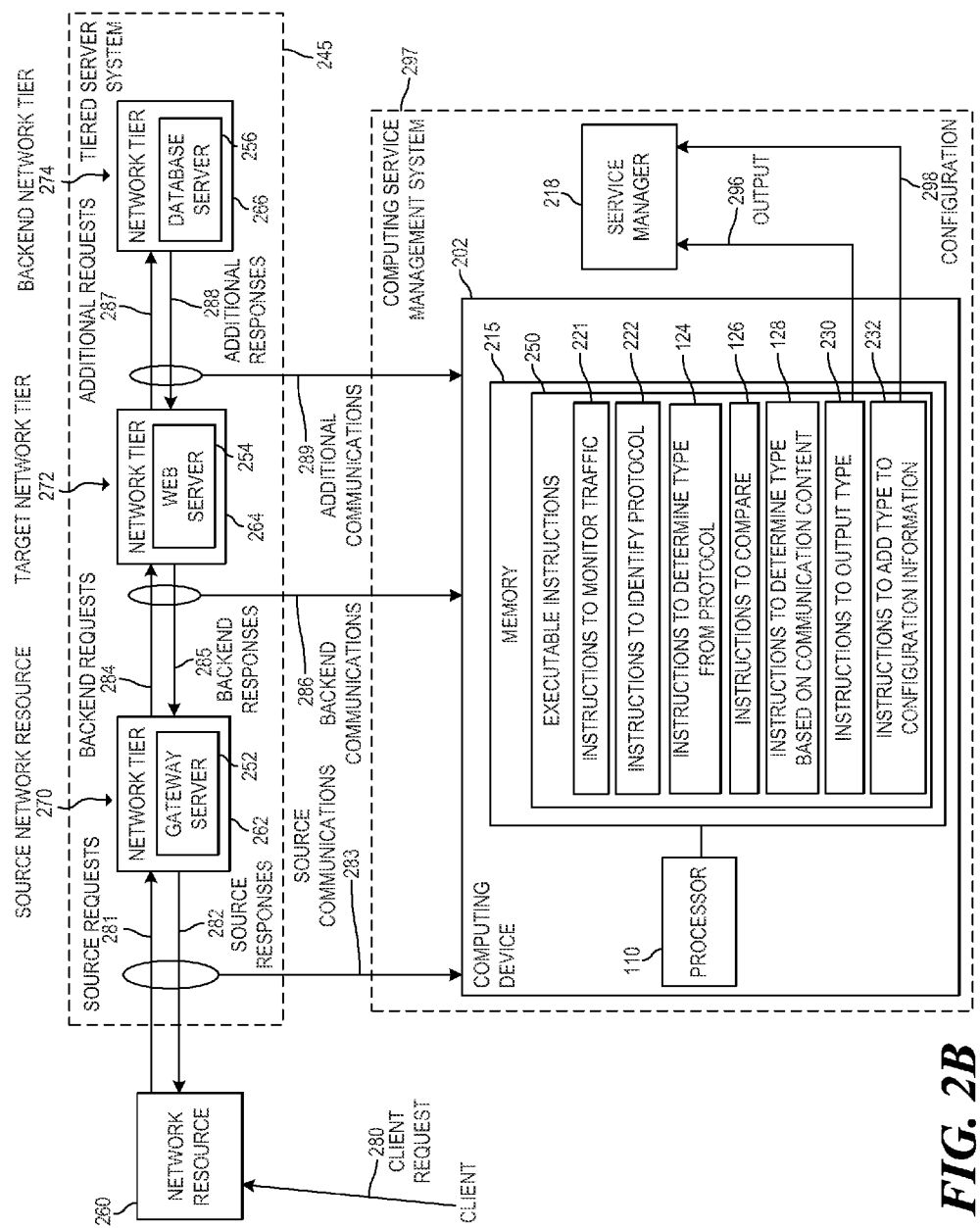
FIG. 2B is a block diagram of an example system to identify a protocol of communications between network tiers.

FIG. 2B is a block diagram of another example system 297 including a computing device 202 to identify a protocol of communications between network tiers. In the example of FIG. 2B, computing service management system 297 includes a service manager 218, as described above in relation to FIG. 2A, and a computing device 202 to implement a traffic monitoring system of system 297 without separate traffic monitoring probes. Computing device 202 includes a processor 110 and a memory 215, as described above in relation to FIG. 2A. In the example of FIG. 2B, memory 215 comprises executable instructions 250 including instructions 124, 126, 128, 230, and 232, as described above in relation to FIG. 2A, and additional instructions 221 and 222. In other examples, executable instructions 250 may include additional instructions. In the example of FIG. 2B, processor 110 may fetch, decode, and execute instructions stored on memory 215 to implement the functionalities described below. In other examples, the functionalities of any of the instructions stored on memory 215 may be implemented in the form of electronic circuitry, in the form of executable instructions encoded on a machine-readable storage medium, or a combination thereof.

In the example of FIG. 2B, computing service management system 297 may manage a computer network including tiered server system 245, as described above in relation to FIG. 2A, including a network tier 262 to communicate with a network resource 260, as described above in relation to FIG. 2A. In the example of FIG. 2B, instructions 221 may monitor network traffic of tiered server system 245, rather than separate traffic monitoring probes. For example, instructions 221 may monitor source communication 283, backend communications 286, and additional communications 289 of system 245.

In such examples, instructions 222 may identify the respective protocols of the monitored communications 283, 286, and 289, as described above in relation to probes 251 and 253 of FIG. 2A. For example, instructions 222 may identify the respective protocols of source, backend, and additional requests 281, 284, and 287. In such examples, instructions 124 may make its determination based on the protocol identifications made by instructions 222. Additionally, in the example of FIG. 2B, instructions 126 may derive the test data from select content of communications, as described above in relation to probes 251 and 253, and may use the derived test data for the comparisons performed by instructions 126. For example, instructions 126 may derive source checksums from respective source responses 282, backend checksums from respective backend responses 285, and additional checksums from respective additional responses 288.

As described above, some examples described herein may, in response to discovery of a network tier, determine the network tier type of a network tier one hop away from the discovered network tier. In some examples, the network tier type determination may be repeated each time a new network tier is discovered. In such examples, the discovered network tier may be referred to as the backend network tier, the network tier one hop away whose type is being determined (and that provides requests to and receives responses from the backend network tier) may be referred to as the target network tier, and a network resource that provides requests to and receives responses from the target network tier may be referred to as the source network resource.

For example, in the example of FIG. 2B, response to discovery of network tier 264, computing device 202 may determine the network tier type of network tier 262. In such examples, while determining the type of network tier 262, network resource 260 may be considered source network resource 270, network tier 262 may be considered target network tier 272, and network tier 264 may be considered backend network tier 274. In such examples, the determination process may proceed as described above in relation to FIG. 2A in relation to the source network resource, the target network tier, and the backend network tier, except without using probes 251 and 253. In such examples, the target and backend network tiers 272 and 274 are each components of a tiered server system 245, while source network resource 270 is a computing device outside of system 245 to provide client requests to system 245. Additionally, the target network tier 272 may be a front-end network tier to receive client requests provided from the source network resource to system 245 in such examples.

Also, in the example of FIG. 2B, in response to the discovery of additional network tier 266, computing device 202 may determine the network tier type of network tier 264 one hop away from tier 266. In such examples, computing device 202 may determine the network tier type of target network tier 272 as described above in relation to FIG. 2A, wherein network tier 262 is considered source network resource 270, network tier 264 is considered target network tier 272, and network tier 266 is considered backend network tier 274, as shown in FIG. 2B, but without using probes 251 and 253. In such examples, the source network resource 270, the target network tier 272, and the backend network tier 274 are each network tiers of a tiered server system to receive and process client requests.

In some examples, computing device 200 of FIG. 2A may also, in response to the discovery of additional network tier 266, determine the network tier type of network tier 264, as described above in relation to FIG. 2A, but wherein network tier 262 is considered source network resource 270, network tier 264 is considered the target network tier 272, and network tier 266 is considered backend network tier 274. In some examples, tiered server system 245 may include more network tiers, and the network tier type determination process may be repeated (e.g., by computing device 200 or 202) for a network tier providing requests to the discovered tier as described above, wherein the discovered tier is considered the backend network tier, the tier whose type is being determined is considered the target network tier, and a network resource (e.g., network tier) providing requests to and receiving responses from the target network tier is considered the source network tier. Additionally, as noted above in relation to FIG. 1, a network may include a multiple different sets of network tiers (e.g., corresponding to respective classes of requests, or applications). Examples described herein may determine the type of a network tier (e.g., as described herein in relation to any of FIG. 1, 2A or 2B) for any set of network tiers of a network. In some examples, functionalities described herein in relation to FIG. 2B may be provided in combination with functionalities described herein in relation to any of FIGS. 1-2A and 3-4.

Figure 3:
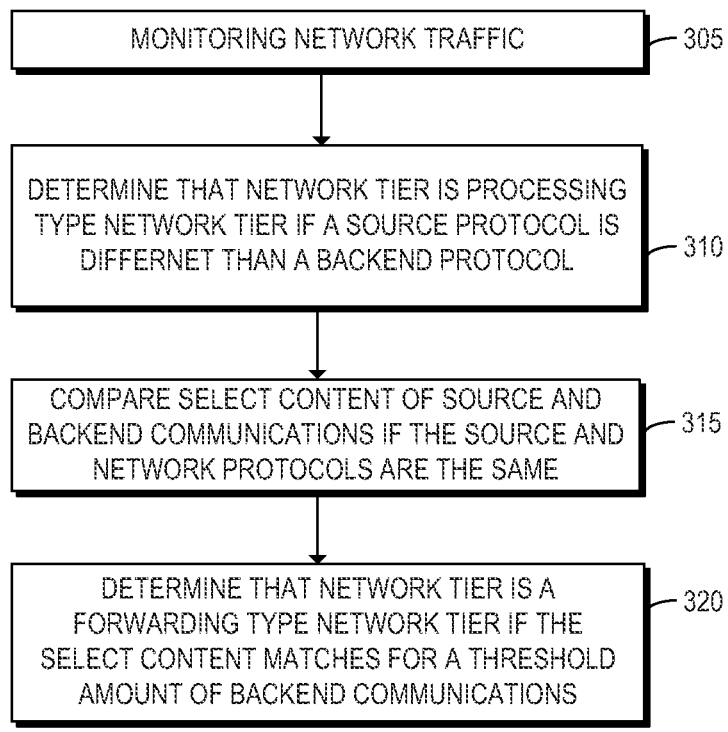
FIG. 3 is a flowchart of an example method for determining that a target network tier is a forwarding type network tier.

FIG. 3 is a flowchart of an example method 300 for determining that a target network tier is a forwarding type network tier. Although execution of method 300 is described below with reference to computing device 200 of FIG. 2A, other suitable components for execution of method 300 can be utilized (e.g., computing device 100, computing device 202). Additionally, method 300 may be implemented in the form of executable instructions encoded on a machine-readable storage medium, in the form of electronic circuitry, or a combination thereof.

At 305 of method 300, network traffic between a source network resource 270 and a target network tier 272 is monitored, and network traffic between the target network tier 272 and a backend network tier 274 is monitored. In some examples, the monitored traffic may include source communications 283 between source network resource 270 and target network tier 272 and backend communications 286 between the target and backend network tiers 272 and 274. At 310, computing device 200 may determine that target network tier 272 is a processing type network tier if a source communication protocol utilized between source network resource 270 and target network tier 272 is different than a backend communication protocol utilized between target and backend network tiers 272 and 274.

In some examples, source communications 283 may be monitored by a traffic monitoring probe 251 and backend communications 286 may be monitored by a traffic monitoring probe 253. In such examples, the probes may identify the source and backend protocols, and provide information identifying the protocols to computing device 200. In other examples, a computing device (e.g., computing device 202) that determines the network tier type of target network tier 272 may monitor source and backend communications 283 and 285. In such examples, the computing device that determines the network tier type may also identify the source and backend protocols.

At 315, if the source and backend communication protocols are the same, computing device 200 may compare select content of respective backend communications 286 between target and backend network tiers 272 and 274 to select content of respective source communications 283 between target network tier 272 and source network resource 270. At 320, computing device 200 may determine that target network tier 272 is a forwarding type network tier if, for at least a threshold amount of the backend communications 283, the select content of a respective backend communication 286 matches the select content of a respective source communication 283.

Figure 4:
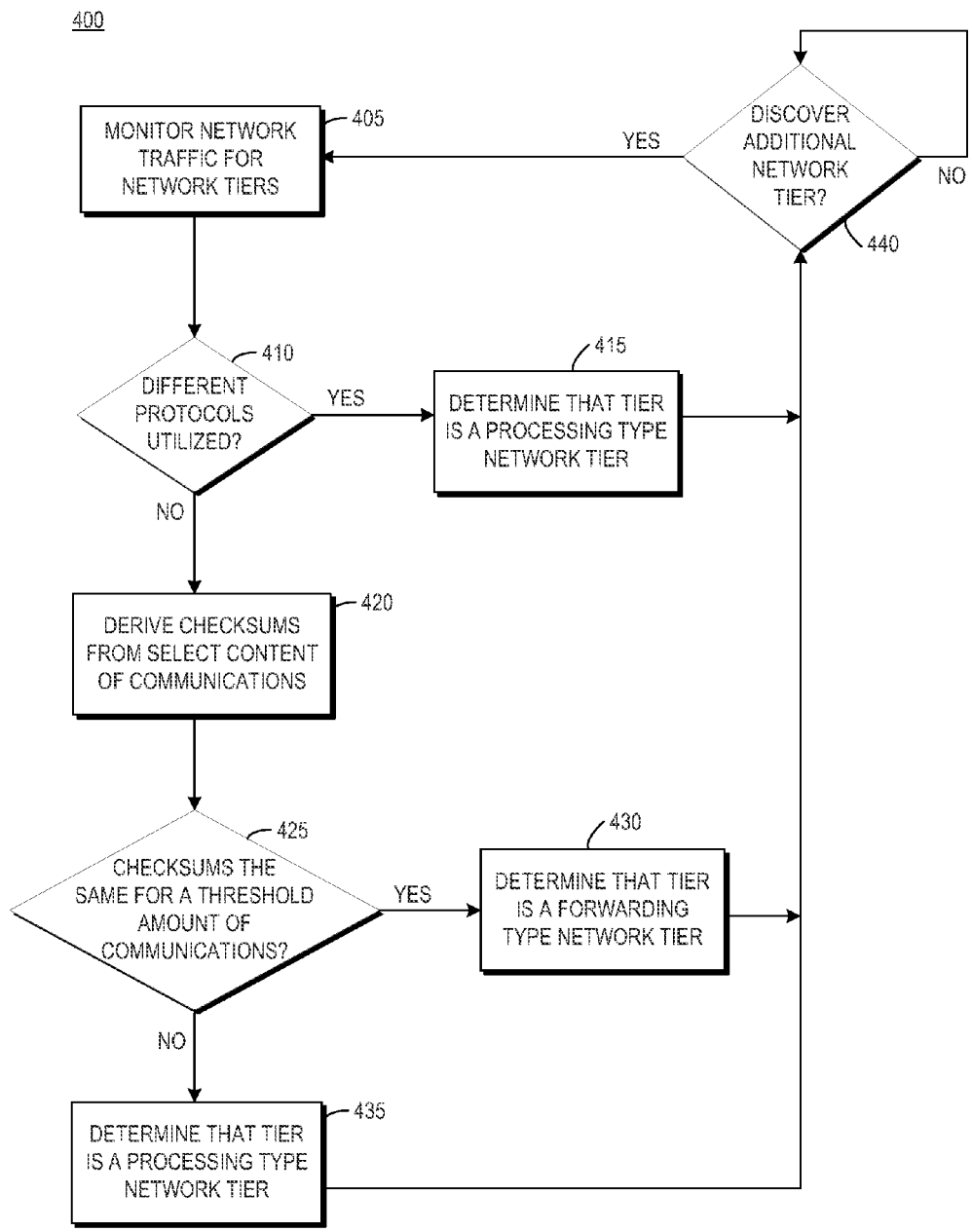
FIG. 4 is a flowchart of an example method for determining whether a target network tier is a forwarding or processing type network tier.

FIG. 4 is a flowchart of an example method 400 for determining whether a target network tier is a forwarding or processing type network tier. Although execution of method 400 is described below with reference to computing device 200 of FIG. 2A, other suitable components for execution of method 400 can be utilized (e.g., computing device 100, computing device 202). Additionally, method 400 may be implemented in the form of executable instructions encoded on a machine-readable storage medium, in the form of electronic circuitry, or a combination thereof.

At 405 of method 400, network traffic between a source network resource 270 and a target network tier 272 is monitored, and network traffic between target network tier 272 and a backend network tier 274 is monitored. In some examples, the monitored traffic may include source communications 283 between source network resource 270 and target network tier 272 and backend communications 286 between target and backend network tiers 272 and 274. In some examples, the network traffic may be monitored by traffic monitoring probes in communication with computing device 200, or may be monitored by a computing device (e.g., computing device 202) to determine the type of target network tier 272.

At 410, computing device 200 may determine whether a source communication protocol utilized between source network resource 270 and a target network tier 272 is different than a backend communication protocol utilized between target and backend network tiers 272 and 274. If the source and backend protocols are different, method 400 may proceed to 415, where computing device 200 may determine that target network tier 272 is a processing type network tier. Method 400 may then proceed to 440.

If the source and backend protocols are not different, method 400 may proceed to 420, where, for each of the backend communications 286, a backend checksum may be derived from the select content of the backend communication 286 and computing device 200 may determine that the select content of the backend communication 286 matches the select content of a respective source communication 283 if the backend checksum is equivalent to a source checksum representing the select content of the respective source communication 283. In examples in which the network traffic is monitored by probes, the probes may also derive the backend checksums and the source checksums and provide these checksums to computing device 200, which may compare the received checksums. In other examples, the computing device (e.g., computing device 202) that compares the checksums may also derive the checksums from the select content. In other examples, other types of test data may be derived from the select content and compared.

At 425, computing device 200 may determine if, for at least a threshold amount of the backend communications 283, the select content of a respective backend communication 286 matches the select content of a respective source communication 283. If so, method 400 may proceed to 430, where computing device 200 may determine that target network tier 272 is a forwarding type network tier. If not, method 400 may proceed to 435, where computing device 200 may determine that target network tier 272 is a processing type network tier. From 430 and 435, method 400 may proceed to 440, where a discovery process may be performed. If no additional network tier is discovered, the discovery process may continue.

At 440, if an additional network tier (e.g., network tier 266) exchanging additional network traffic with backend network tier 274 is discovered, then in response, method 400 may proceed to 405, where the additional network traffic may be monitored. At 410, it may be determined whether an additional communication protocol utilized between the backend and additional network tiers 274 and 266 is different than the backend communication protocol. If so, then computing device 200 may determine that the backend network tier 274 is a processing type network tier, and then proceed to 440. If not, then computing device 200 may proceed to 420 where computing device may compare select content of the additional communications 289 to select content of respective backend communications 286. For example, at 420, additional checksums may be derived from the select content of the additional communications 289 and the additional checksums may be compared to backend checksums.

At 425, computing device 200 may determine whether, for at least a threshold amount of the additional communications 289, the select content of a respective additional communication 289 matches the select content of a respective backend communication 286. If so, then computing device 200 may determine that the backend network tier 274 is a forwarding type network tier at 430, and then proceed to 440. If not, then computing device 200 may determine that the backend network tier 274 is a processing type network tier at 435, and then proceed to 440.

What is claimed is:

1. A non-transitory machine-readable storage medium encoded with instructions executable by a processor of a computing device to:
   determine that a target network tier is a processing type network tier, if a backend communication protocol utilized between the target network tier and a backend network tier is different than a source communication protocol utilized between the target network tier and a source network resource;
   if the source and backend communication protocols are the same, compare select content of respective backend communications between the target and backend network tiers to select content of respective source communications between the target network tier and the source network resource; and
   determine that the target network tier is a forwarding type network tier if, for at least a threshold amount of the backend communications, the select content of a respective backend communication matches the select content of a respective source communication.

2. The storage medium of claim 1, further comprising instructions to:
   determine that the target network tier is a processing type network tier if the amount of the backend communications having select content matching the select content of a respective source communication is less than the threshold amount.

3. The storage medium of claim 1, wherein:
   the backend communications include backend responses provided from the backend network tier to the target network tier and exclude backend requests provided from the target network tier to the backend network tier; and
   the source communications include source responses provided from the target network tier to the source network resource and exclude source requests provided from the source network resource to the target network tier.

4. The storage medium of claim 1, wherein the instructions to compare comprise instructions to, for each of the backend communications:
   determine that the select content of the backend communication matches select content of a respective one of the source communications if backend test data derived from the select content of the backend communication is equivalent to source test data derived from the select content of the respective source communication.

5. The storage medium of claim 4, wherein:
   for each of the backend and source communications, the backend test data is a hash value derived from the select content of the backend communication and the source test data is a hash value derived from the select content of the source communication; and
   the threshold amount of the backend communications is a threshold percentage of the backend communications exchanged between the target and backend network tiers within a threshold time period.

6. The storage medium of claim 1, wherein:
   the target and backend network tiers are each components of a tiered server system;
   the source network resource is a computing device to provide client requests to the tiered server system; and
   the target network tier is a front-end network tier to receive the client requests provided from the source network resource to the tiered server system.

7. The storage medium of claim 1, wherein the source network resource, the target network tier, and the backend network tier are each network tiers of a tiered server system to receive and process client requests.

8. A system comprising:
   a memory encoded with a set of executable instructions; and a processor to execute the instructions, wherein the instructions, when executed, cause the processor to:
in response to discovery of a backend network tier, determine that a target network tier is a processing type network tier, if a protocol of backend requests provided from the target network tier to the backend network tier is different than a protocol of source requests received by the target network tier from a source network resource;
if the respective protocols of the backend and source requests are the same, compare select content of backend responses, provided from the backend network tier to the target network tier, to select content of source responses, provided from the target network tier to the source network resource; and
determine whether the target network tier is a forwarding type or processing type network tier based on whether the select content of a respective backend response matches the select content of a respective source response for at least a threshold amount of the backend responses.

9. The system of claim 8, wherein the instructions to determine whether the target network tier is a forwarding type or processing type network tier comprise instructions to:
determine that the target network tier is a forwarding type network tier if, for each of at least the threshold amount of the backend responses, the select content of the backend response matches the select content of a respective source response; and
determine that the target network tier is a processing type network tier if the select content of a respective backend response matches the select content of a respective source response for less than the threshold amount of backend responses.

10. The system of claim 9, wherein:
for each of the source and backend responses, the select content excludes a message header of the respective communication;
the instructions to compare comprise instructions to, for each of the backend responses, determine that the select content of the backend response matches the select content of a respective one of the source responses if a backend checksum derived from the select content of the backend response is equivalent to a source checksum derived from the select content of the respective source response; and
the threshold amount of the backend responses is a threshold percentage of the backend responses provided from the backend network tier to the target network tier within a threshold time period.

11. The system of claim 10, wherein the instructions further comprise instructions that, when executed, cause the processor to:
acquire, from respective monitoring probes, an identification of the protocol of the backend requests and an identification of the protocol of the source requests;
acquire, from the monitoring probes, the backend checksums derived from the backend responses and the source checksums derived from the source responses;
instruct a service manager to output, via a user interface of the service manager, an indication that the target network tier is a forwarding type network tier, in response to a determination that the target network tier is a forwarding type network tier; and
instruct a service manager to output, via the user interface, an indication that the target network tier is a processing type network tier, in response to a determination that the target network tier is a processing type network tier.

12. The system of claim 10, wherein the instructions further comprise instructions that, when executed, cause the processor to:
identify the protocol of the backend request;
derive the source and backend checksums;
add, to configuration information of a service manager, an indication that the target network tier is a forwarding type network tier, in response to a determination that the target network tier is a forwarding type network tier; and
add, to the configuration information of the service manager, an indication that the target network tier is a processing type network tier, in response to a determination that the target network tier is a processing type network tier.

13. A method comprising:
monitoring network traffic between a source network resource and a target network tier, and between the target network tier and a backend network tier;
determining that the target network tier is a processing type network tier if a source communication protocol utilized between the source network resource and a target network tier is different than a backend communication protocol utilized between the target and backend network tiers;
if the source and backend communication protocols are the same, comparing select content of respective backend communications between the target and backend network tiers to select content of respective source communications between the target network tier and the source network resource, wherein the network traffic includes the source and backend communications; and
determining that the target network tier is a forwarding type network tier if, for at least a threshold amount of the backend communications, the select content of a respective backend communication matches the select content of a respective source communication.

14. The method of claim 13, wherein the comparing comprises, for each backend communication:
deriving a backend checksum from the select content of the backend communication; and
determining that the select content of the backend communication matches the select content of a respective source communication if the backend checksum is equivalent to a source checksum representing the select content of the respective source communication.

15. The method of claim 13, further comprising:
in response to the discovery of an additional network tier exchanging additional network traffic with the backend network tier, monitoring the additional network traffic;
determining that the backend network tier is a processing type network tier if an additional communication protocol utilized between the backend and additional network tiers is different than the backend communication protocol;
comparing select content of the additional communications to the select content of respective backend communications, if the backend and additional communication protocols are the same; and
determining that the backend network tier is a forwarding type network tier if, for at least a threshold amount of the additional communications, the select content of a respective additional communication matches the select content of a respective backend communication.

* * * * *